United States Patent [19]
Nakajima et al.

[11] Patent Number: 5,387,773
[45] Date of Patent: Feb. 7, 1995

[54] GAS CIRCUIT BREAKER

[75] Inventors: Nobuya Nakajima; Toshiaki Yoshizumi; Mikio Hidaka, all of Amagasaki, Japan

[73] Assignee: Mitsubishi Denki Kabushiki Kaisha, Tokyo, Japan

[21] Appl. No.: 100,302

[22] Filed: Aug. 2, 1993

[30] Foreign Application Priority Data

Sep. 16, 1992 [JP] Japan .................. 4-246314

[51] Int. Cl.⁶ .................................. H01H 33/82
[52] U.S. Cl. ............................ 200/148 A; 200/148 B
[58] Field of Search .......... 200/146 A, 148 R, 148 A, 200/148 B, 148 C, 148 E, 148 G, 149 A, 150 G

[56] References Cited

U.S. PATENT DOCUMENTS 4,516,006  5/1985  Kobayashi et al. ............. 200/148 A
4,749,831  6/1988  Hosomi et al. .................. 200/148 A

FOREIGN PATENT DOCUMENTS 60-36050   8/1985  Japan .
63-198144  12/1988  Japan .

*Primary Examiner*—A. D. Pellinen
*Assistant Examiner*—Michael A. Friedhofer
*Attorney, Agent, or Firm*—Oblon, Spivak, McClelland, Maier, & Neustadt

[57] ABSTRACT

In a stationary contact unit of a gas circuit breaker, an arc-quenching cylinder for passing an arc-quenching insulation gas is formed in a substantially semicircular shape, and the stationary contact unit is supported by an insulation frame which is disposed beneath the dent part of the semicircular portion of the arc-quenching cylinder. The insulation frame is prevented from the degradation of dielectric strength between the stationary contact unit and a grounded tank, and the size of the gas circuit breaker is decreased.

7 Claims, 3 Drawing Sheets

GAS CIRCUIT BREAKER

FIELD OF THE INVENTION AND RELATED ART STATEMENT

1. Field of the Invention

The present invention relates to a gas circuit breaker, and especially relates to an improvement of supporting means in a puffer-type circuit breaker.

2. Description of the Related Art

A conventional gas-circuit breaker which is, for example, shown in U.S. Pat. No. 4,749,831 issued to Hosomi et al. is elucidated in reference to FIGS. 4 and 5. FIG. 4 is a cross-sectional side view of the gas circuit breaker, FIG. 5 is a sectional view taken along line V—V of FIG. 4.

As shown in FIG. 4, a stationary contact unit 10 and a movable contact unit 20 are provided in a tank 3 filled with insulation gas 70, e.g., $SF_6$ gas. The stationary contact unit 10 having a stationary main contact 1 and a stationary arc contact 4 is connected by a supporting means 5. The supporting means 5 is supported by an insulator 60 which is fixed to the tank 3.

As shown in FIG. 5 which shows a sectional view taken along line V—V of FIG. 4, the supporting means 5 comprises a flange 7 fixed to the stationary main contact 1, and a cross bar 8 fixed to the flange 7 by tightening bolts 9. The above-mentioned insulator 60 for supporting the stationary contact unit 10 is connected to a bottom portion 7a of the flange 7. Center part 8a of the cross bar 8 has a threaded portion 8b for fixing the stationary arc contact 4.

Breaking operation of the conventional gas circuit breaker is described with reference to FIGS. 4 and 5.

In the breaking operation, a movable main contact 2 and a movable arc contact 6 of the movable contact unit 20 are driven in a direction shown by an arrow A in FIG. 4. The movable arc contact 6 is disconnected from the stationary arc contact 4 after disconnection of the movable main contact 2 from the stationary main contact 1. When the stationary arc contact 4 and the movable arc contact 6 are disconnected, an arc 50 is produced between the stationary arc contact 4 and the movable arc contact 6. At the same time as the generation of the arc 50, the insulation gas 70 is compressed by movement of a puffer cylinder 13 of the movable contact unit 20 to be blown against the arc 50 through a nozzle 12.

When the compressed insulation gas 70 is blown against the arc 50, the insulation gas 70 is heated by the arc 50. The hot gas 70a, that is the blown insulation gas 70, having a high temperature and a degraded dielectric strength flows through an opening 5a of the flange 7 as shown by arrows B, C, D in FIG. 4. A large quantity of the hot gas 70a discharging from the opening 5a is led to the surface of the insulator 60 which supports the stationary contact unit 10.

Accordingly, the dielectric strength of the insulator 60 is deteriorated because the insulator 60 is exposed by the hot gas 70a in the breaking operation, and the reliability of the conventional gas circuit breaker is degraded for the deterioration of the dielectric strength of the insulator 60.

OBJECT AND SUMMARY OF THE INVENTION

An object of the present invention is to provide an improved gas circuit breaker wherein a stationary contact unit is supported by an insulator in an improved manner not to be affected by the hot gas owing to the arc-quenching insulation gas.

The gas circuit breaker in accordance with the present invention comprises:

a grounded tank which is filled with insulation gas;

a stationary contact disposed in the grounded tank for contacting and departing from a movable contact;

an arc-quenching cylinder which is connected to the stationary contact to pass the insulation gas which is blown to arc generated between the stationary contact and the movable contact;

an insulation frame which is arranged beneath the arc-quenching cylinder fixed to an inner wall of the grounded tank in a manner to support the arc-quenching cylinder.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 1:
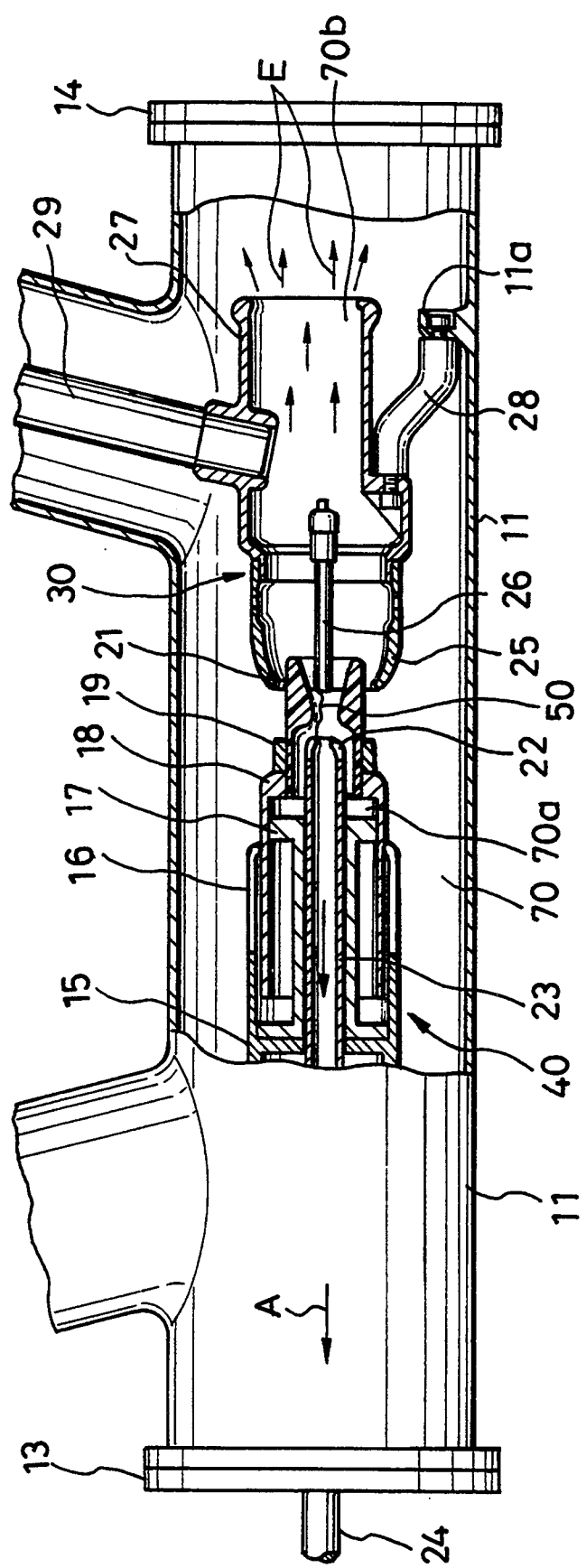
FIG. 1 is a cross-sectional side view showing a preferred embodiment of a gas circuit breaker in accordance with the present invention.
Figure 2:
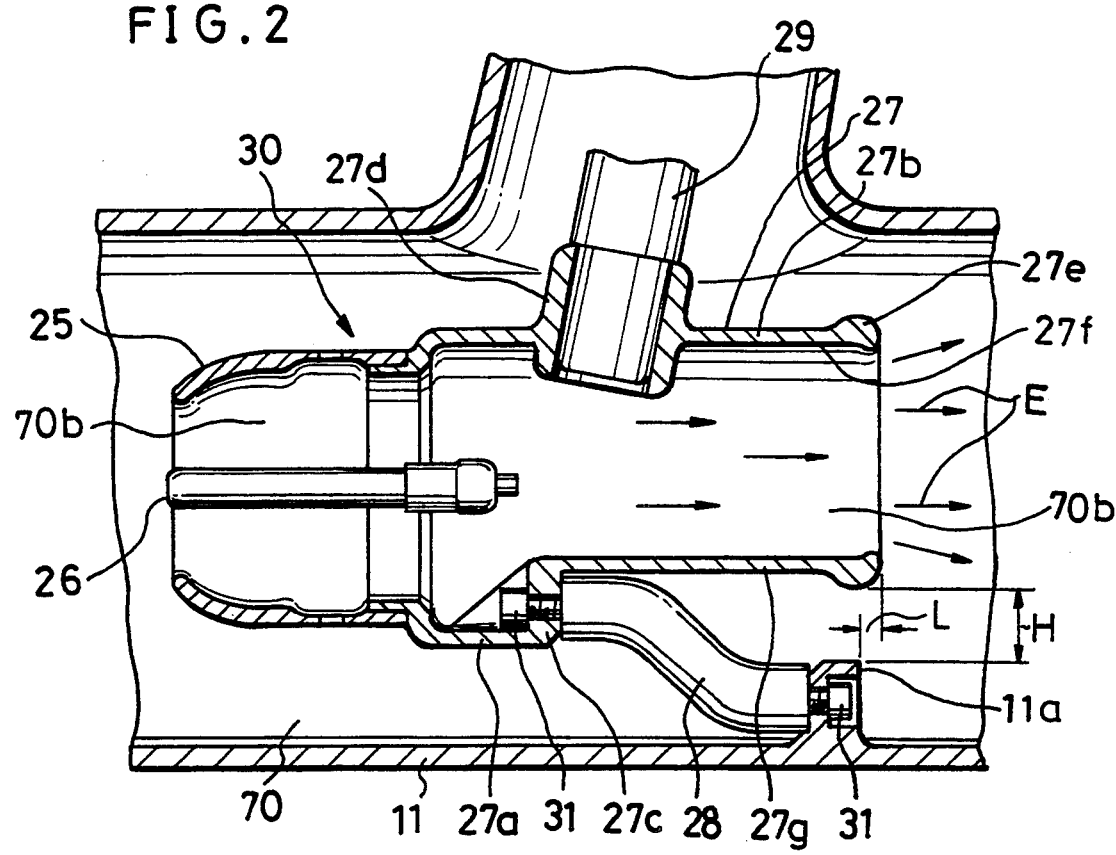
FIG. 2 is a cross-sectional side view showing details of the gas circuit breaker of FIG. 1.
Figure 3:
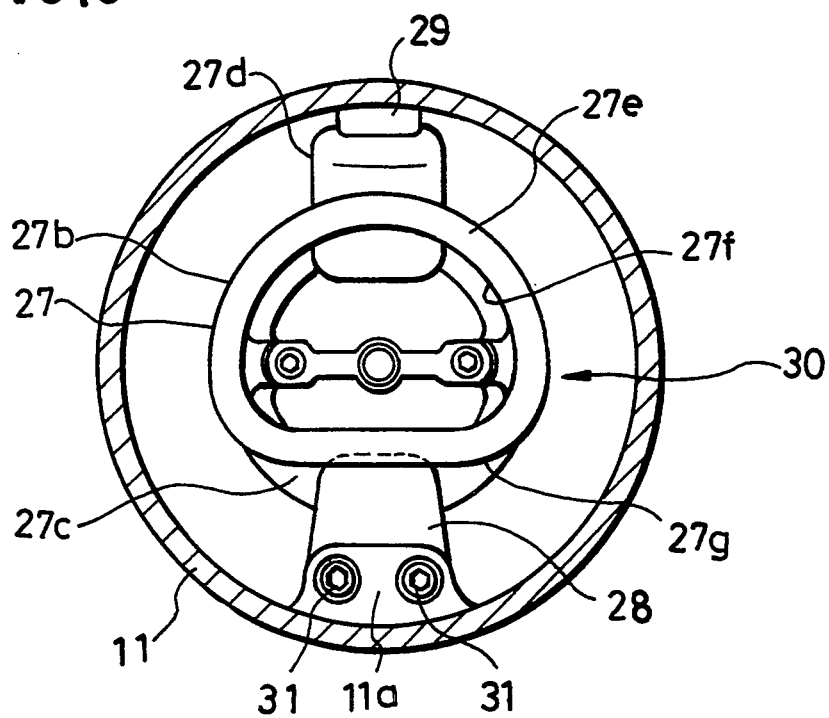
FIG. 3 is a cross-sectional front view showing details of the gas circuit breaker of FIG. 2.
Figure 4:
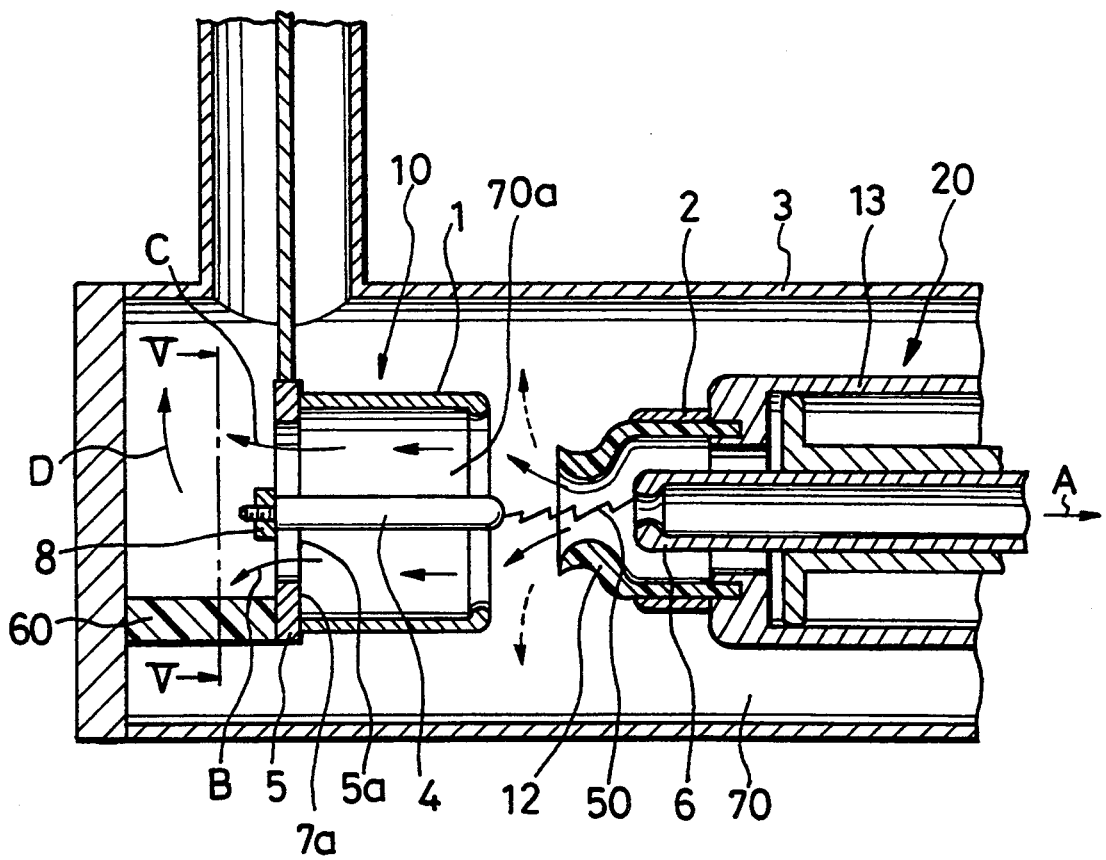
FIG. 4 is the cross-sectional side view of the conventional gas circuit breaker.
Figure 5:
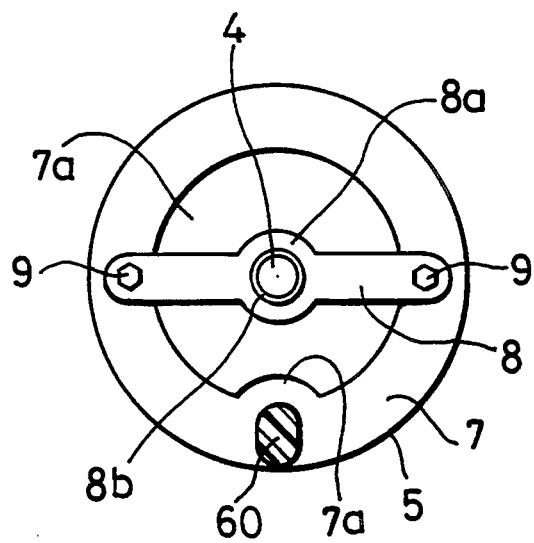
FIG. 5 is the sectional view taken along line V—V of the gas circuit breaker in FIG. 4.

Hereafter, a preferred embodiment of a gas circuit breaker in accordance with the present invention is described with the accompanying drawings of FIGS. 1 to 3. FIG. 1 is a sectional side view of the gas circuit breaker of the preferred embodiment. FIG. 2 is a sectional side view showing a detailed constitution of a stationary contact unit 30 of the circuit breaker shown in FIG. 1. FIG. 3 is a sectional front view showing the detailed constitution of the stationary contact unit 30 of FIG. 2.

In FIG. 1, a grounded tank 11, of which both ends are closed air-tightly by end plates 13, 14, is filled with insulation gas 70, e.g., $SF_6$ gas for arc-quenching. The stationary contact unit 30 and a movable contact unit 40, which are to be electrically contacted to or separated from each other, are provided in the grounded tank 11.

A conductor 15 of the movable contact unit 40 is supported by an insulator (not shown) which is fixed to the grounded tank 11. A piston 17, which is fixed to the conductor 15, is arranged within a collector 16. A puffer cylinder 18 is movably provided between the collector 16 and piston 17. An inner face of the puffer cylinder 18 is slidably connected to an outer face of the piston 17, and an outer face of the puffer cylinder 18 is electrically contacted with the collector 16. A movable main contact 19 for electrically contacting or separating from a stationary main contact 25 of the stationary contact unit 30 is provided on an end portion of the puffer cylinder 18 (that is, on a right end portion of the puffer cylinder 18 shown in FIG. 1). An insulation nozzle 21, which is fixed to the inside of the puffer cylinder 18, is arranged to lead the insulation gas 70 compressed by the movement of the puffer cylinder 18 toward an arc 50. A movable arc contact 22, which is arranged within the insulation nozzle 21, is connected to the piston rod 23 which is slidably arranged in the piston 17. The piston rod 23 is connected to an operation rod 24 which is provided to pierce through the left side end plate 13 of FIG. 1. The operation rod 24 is driven by an operation unit (not shown) to make a closed state or an opened state between the stationary contact unit 30 and the movable contact unit 40.

FIG. 2 shows a sectional side view of the stationary contact unit 30 which is provided to electrically connect or disconnect to the movable contact unit 40. As shown in FIG. 2, the stationary contact unit 30 has a stationary main contact 25, a stationary arc contact 26 and an arc-quenching cylinder 27. The stationary arc contact 26 is arranged on a substantially center axis of the stationary main contact 25 having a cylindrical shape as shown in FIG. 2. The arc-quenching cylinder 27, which is connected to the stationary main contact 25, has a cylinder portion 27a connecting to the stationary main contact 25, a substantially semicircular section portion 27b which is continuous with the cylinder portion 27a, a mounting portion 27c provided on a connecting part between the cylinder portion 27a and the substantially semicircular section portion 27b, and a connector portion 27d for connecting a conductor 29.

FIG. 3 shows a sectional front view of the stationary contact unit 30 in the above-mentioned gas circuit breaker. As shown in FIG. 3, the substantially semicircular section portion 27b of the arc-quenching cylinder 27 is formed in a substantially semicircular shape in section. A dent part 27g of the substantially semicircular section portion 27b is arranged at a lower part of the arc-quenching cylinder 27. The connector portion 27d of the arc-quenching cylinder 27 is arranged at an upper part of the arc-quenching cylinder 27 in order to connect with the conductor 29. The mounting portion 27c for connecting an insulation frame 28 has mounting holes for inserting screw bolts 31. The mounting portion 27c is arranged at a lower part of the arc-quenching cylinder 27, that is on an opposite position as the connector portion 27d. The substantially semicircular section portion 27b, which is connected to the circular portion 27a in a manner to pass the insulation gas 70 blown against arc 50, has an outlet 27f for discharging the insulation gas which has passed through the substantially semicircular section portion 27b. An edge 27e of the outlet 27f, that is a right-end part of the substantially semicircular section portion 27b shown in FIG. 2, is formed to have a curved surface for relieving electrical field intensity.

The above-mentioned stationary contact unit 30 is supported by the insulation frame 28 which is made of insulation materials. One end of the insulation frame 28 is connected to the mounting portion 27c by tightening screw bolts 31, and the other end is fixed to a mounting plate 11a of the grounded tank 11 by tightening screw bolts 31. The mounting plate 11a is arranged beneath the substantially semicircular section portion 27b to have a vertical height H from an upper face of the mounting plate 11a to a lower face of the substantially semicircular section portion 27b as shown in FIG. 2. And the mounting plate 11a is disposed to have a horizontal length L between a right end of the mounting plate 11a and a right end of the outlet 27f of the arc-quenching cylinder 27 as shown in FIG. 2.

Breaking operation of the above-mentioned gas circuit breaker in accordance with the present invention is described with reference to FIGS. 1 and 2.

In the breaking operation, the movable main contact 19 and the movable arc contact 22 are driven by the operation rod 24 in a direction shown by an arrow A in FIG. 1. The movable arc contact 22 is disconnected from the stationary arc contact 26 after the movable main contact 19 is disconnected from the stationary main contact 25. Thus an arc 50 is produced between the movable arc contact 22 and the stationary arc contact 26. Simultaneous with generation of the arc 20, the insulation gas 70 being compressed by movement of the puffer cylinder 18 of the movable contact unit 40 (that is compressed gas 70a shown in FIG. 1) is blown against the arc 50 through the insulation nozzle 21. The blown insulation gas 70 is heated by the arc 50, therefore the insulation gas 70 becomes hot gas 70b having a high temperature and a harmful influence for an insulator. The hot gas 70b is led around the stationary arc contact 26 within the stationary main contact 25, and flows to an inner space of the arc-quenching cylinder 27. The hot gas 70b in the arc-quenching cylinder 27 is discharged from the outlet 27f of the arc-quenching cylinder 27 to the grounded tank 11 as shown by arrows E in FIGS. 1 and 2.

As shown in FIG. 2, since the arc-quenching cylinder 27 is arranged to overhang the insulation frame 28, the insulation frame 28 is not exposed by the hot gas 70b which is discharged from the outlet 27f of the arc-quenching cylinder 27. As a result, the stationary contact unit 30 is kept on a good insulator, and a deterioration of the dielectric strength of the insulation frame 28 is prevented.

Since the mounting portion 27c of the arc-quenching cylinder 27 is arranged between the cylinder portion 27a and the dent part 27g of the substantially semicircular section portion 27b, and the insulation frame 28 is disposed in a space between the grounded tank 11 and the dent part 27g of the substantially semicircular section potion 27b, the gas circuit breaker of this embodiment is small in size and further has an increased dielectric strength.

In the above-mentioned embodiment, a part of the arc-quenching cylinder 27 has been formed in a substantially semicircular section shape, and the insulation frame 28 is disposed in the space between the grounded tank 11 and the dent part 27g of the substantially semicircular section portion 27b. In a modified embodiment, an arc-quenching cylinder is formed in circular cylinder and an insulation frame is disposed beneath the arc-quenching cylinder not to be exposed by the hot gas if the modified embodiment has a room between a grounded tank and a stationary contact unit.

As has been described with respect to the gas circuit breaker in accordance with the present invention, the insulation frame as an insulator for supporting the stationary contact unit is not exposed by the high temperature hot gas owing to arc quenching. Therefore, the gas circuit breaker of the present invention is prevented from the degradation of the dielectric strength between the stationary contact unit and the grounded tank, and kept on a high reliability.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications that fall within the true spirit and scope of the invention.

What is claimed is:

1. A gas circuit breaker comprising:
   a grounded tank which is filled with insulation gas;
   a stationary contact disposed in said grounded tank for contacting and departing from a movable contact;
   an arc-quenching cylinder which is connected to said stationary contact to pass said insulation gas which is blown to an arc generated between said stationary contact and said movable contact; and
   an insulation frame which is arranged beneath said arc-quenching cylinder and fixed to an inner wall of said grounded tank in a manner to support said arc-quenching cylinder;
   wherein:
      said arc-quenching cylinder has a substantially semicircular section portion wherein a flat wall part forming a dent part thereunder is arranged at a bottom of said arc-quenching cylinder;
      said insulation frame is disposed beneath said dent part of said substantially semicircular section portion;
      said arc-quenching cylinder has a cylinder portion for connecting to said stationary contact, and a mounting portion for connecting to said insulation frame; and
      said mounting portion is provided between said dent part and said cylinder portion.

2. A gas circuit breaker in accordance with claim 1 wherein:
   said stationary contact has a stationary main contact formed in a substantially cylindrical shape, and a stationary arc contact arranged at a substantially center of said stationary main contact; and
   said arc-quenching cylinder is formed continuous to said stationary main contact in a manner to pass said insulation gas which has been heated by the arc between said stationary arc contact and a movable arc contact of said movable contact.

3. A gas circuit breaker in accordance with claim 2, wherein:
   said arc-quenching cylinder has an outlet for discharging said insulation gas, and an edge of said outlet is formed to have a curved shape.

4. A gas circuit breaker comprising:
   a grounded tank which is filled with insulation gas,
   a stationary contact disposed in said grounded tank for contacting and departing from a movable contact;
   an arc-quenching cylinder which is connected to said stationary contact for passing said insulation gas which his blown to an arc generated between said stationary contact and the movable contact; and
   an insulation frame for supporting said arc-quenching cylinder within said grounded tank, said insulation frame being radially positioned between a lower portion of said arc-quenching cylinder and an inner wall of said grounded tank which is opposed to said lower portion of said arc-quenching cylinder, said insulation frame having a first end fixed to a mounting section on said lower portion of said arc-quenching cylinder and a second end fixed to said inner wall of said grounded tank.

5. A gas circuit breaker in accordance with claim 4, wherein:
   an upper portion of said arc-quenching cylinder comprises a connector for connecting a conductor thereto, such that said mounting section on said lower portion of said arc-quenching cylinder is opposite to said connector on the upper portion of said arc-quenching cylinder.

6. A gas circuit breaker in accordance with claim 4, wherein:
   said stationary contact has a stationary main contact formed in a substantially cylindrical shape, and a stationary arc contact arranged at a substantially center of said stationary main contact; and
   said arc-quenching cylinder is formed continuous to said stationary main contact in a manner to pass said insulation gas which has been heated by the arc between said stationary arc contact and a movable arc contact of said movable contact.

7. A gas circuit breaker in accordance with claim 6, wherein:
   said arc-quenching cylinder has an outlet for discharging said insulation gas, and an edge of said outlet is formed to have a curved shape.

* * * * *